United States Patent [19]
Asakura et al.

[11] Patent Number: 6,120,191
[45] Date of Patent: Sep. 19, 2000

[54] LASER DIODE MODULE

[75] Inventors: Hiroyuki Asakura, Osaka; Yasuhiro Tanaka, Ashiya, both of Japan

[73] Assignee: Matsushita Electric Industrial Co., Ltd., Osaka-Fu, Japan

[21] Appl. No.: 09/030,440

[22] Filed: Feb. 25, 1998

[30] Foreign Application Priority Data

Feb. 26, 1997 [JP] Japan ................................. 9-041859
Sep. 8, 1997 [JP] Japan ................................. 9-242502

[51] Int. Cl.$^7$ ........................................... G02B 6/36
[52] U.S. Cl. ........................ 385/93; 385/33; 385/37; 385/92
[58] Field of Search .................. 385/31, 33, 35, 385/88, 89, 93, 94, 92, 37

[56] References Cited

U.S. PATENT DOCUMENTS

| | | | |
|---|---|---|---|
| 5,031,991 | 7/1991 | Nakatsu et al. | 385/93 |
| 5,132,843 | 7/1992 | Aoyama et al. | 385/37 |
| 5,283,446 | 2/1994 | Tanisawa | 257/433 |
| 5,309,542 | 5/1994 | Strope et al. | 385/140 |
| 5,412,506 | 5/1995 | Feldblum et al. | 385/33 |
| 5,537,504 | 7/1996 | Cina et al. | 385/93 |
| 5,555,334 | 9/1996 | Ohnishi et al. | 385/93 |
| 5,790,730 | 8/1998 | Kravitz et al. | 385/49 |

FOREIGN PATENT DOCUMENTS

| | | |
|---|---|---|
| 6-018170 | 9/1985 | Japan . |
| 61-245594 | 10/1986 | Japan . |
| 4-78030 | 3/1992 | Japan . |
| 4-328516 | 11/1992 | Japan . |
| 5-27140 | 2/1993 | Japan . |
| 5-60940 | 3/1993 | Japan . |
| 5-66358 | 3/1993 | Japan . |
| 7-253526 | 10/1995 | Japan . |
| 8-304741 | 11/1996 | Japan . |

*Primary Examiner*—Hemang Sanghavi
*Attorney, Agent, or Firm*—Wenderoth, Lind & Ponack, L.L.P.

[57] ABSTRACT

In a laser diode module which can be coupled optically to an optical fiber, a laser beam emitted by a laser diode is focused by a lens on an end of an optical fiber. The lens is made of a plastic material and has concentric diffraction zones on at least one surface thereof. In a modified laser diode module, a planer diffraction lens is provided beside the focusing lens, and the planer diffraction lens has diffraction zones on at least one surface thereof.

28 Claims, 14 Drawing Sheets

LASER DIODE MODULE

BACKGROUND OF THE INVENTION

1. Field of the Invention

The present invention relates to a laser diode module connectable to an optical fiber for optical coupling and used for optical communication, optical measurement or the like.

2. Description of Prior Art

In a photosensor module used for optical communication or the like, efficient optical coupling is necessary between a light emitting element or a detector and an optical fiber. A laser diode module, one of the photosensor modules, has a laser diode, a focusing lens, a lens holder and a ferrule holder for holding an optical fiber. An end of the optical fiber is inserted into the ferrule holder and fixed therein, and a laser beam emitted from the laser diode transmits through the focusing lens so as to be focused on the incident end of the optical fiber.

An aspheric lens made of glass is used mainly as the focusing lens. Recently, an aspheric lens made of plastics is also used as the focusing lens in order to decrease the cost thereof (for example, Japanese Patent laid open Publications No. 5-60952/1993, 61-245594/1986, 5-27140 and 5-60940).

When an aspheric focusing lens is used in a laser diode module, if the aspheric lens is made of glass, it is expensive, and this increases the cost of laser diode module. On the other hand, an aspheric focusing lens made of plastics has a larger thermal expansion coefficient than that of glass, and the index of refraction depends on temperature. Then, when a plastic aspheric lens is used, if a distance between the laser diode and the lens is fixed, the focal distance or a focus position in the direction of the optical fiber is changed with temperature. For example, in an optical system wherein the lens material is amorphous polyorefin, the laser diode emits a laser beam of 780 nm, the distance between the laser and the optical fiber is 10 mm and the magnifying power of lens is three, the shift of the focal position due to temperature is 8 $\mu$m/deg. Thus, the coupling efficiency of the laser diode module to the optical fiber changes with temperature because the laser diode, the lens and the optical fiber are all fixed in the laser diode module. The laser diode module is adjusted and fabricated at room temperature, and the output from the laser diode module decreases at high temperatures and at low temperatures. FIG. 7 shows an example of the temperature dependence of the output from the optical fiber between −20 and 80° C. in a prior art laser diode module coupled to a multi-mode optical fiber of core diameter of 50 $\mu$m in the above-mentioned conditions. It is found that the output is decreased more than 10% at high and low temperatures.

In order to keep the optical output from a laser diode module below a predetermined reference value for safety purposes during handling, it is known to stop light emission automatically or to limit the optical output when the optical fiber is slipped out from the module. A function which has to be added for controlling the intensity of the laser beam for the safety standard makes the structure of the laser diode module complex and makes the cost thereof higher. A control circuit is needed to stop light emission when slip out of the optical fiber is detected.

In order to limit optical intensity, it is known to provide an aperture member to limit the light intensity, and the aperture member limits the laser beam transmitted through the focusing lens. However, because this restricts transmittance through the area of the aperture, the characteristic is changed due to the scattering of the light emission angle of laser beam. Thus, high precision is needed for fabricating the aperture member. Further, the number of fabrication steps is increased for the position control and the like. These accompany an increase in cost.

SUMMARY OF THE INVENTION

An object of the present invention is to provide a laser diode module for optical coupling a stable temperature characteristic.

In one aspect of the invention, a laser diode module has a laser diode and a focusing lens made of a plastic material. Further, a holder holds the laser diode and the focusing lens and fixes an end of an optical fiber at a predetermined position. The focusing lens focuses a laser beam emitted by the laser diode on the end of the optical fiber. The focusing lens has diffraction zones on at least one of the surfaces thereof so that the shift of the focal position due to temperature change is decreased. Preferably, a shape of the diffraction zones and distances between the diffraction zones of the focusing lens are determined such that a focal position due to a change in oscillation wavelength of the laser diode due to temperature change is shifted in a direction opposite to the shift due to thermal expansion or contraction of the focusing lens. Preferably, an aperture member is provided near the end of the optical fiber to limit the light intensity. In a different way, a laser diode module further comprises a planer diffraction lens. The laser beam transmitting the focusing lens and the planer diffraction lens is focused onto the end of the optical fiber. The planer diffraction lens has diffraction zones on at least one surface thereof so that the shift of the focal position due to temperature change is decreased.

In another aspect of the invention, a laser diode light source comprises a laser diode which emits a laser beam and a lens which transmits the laser beam emitted from the laser diode. The lens has diffraction zones on at least one of the surfaces thereof so that the shift of the focal position due to temperature change is decreased.

An advantage of the present invention is that the shift of focal position due to temperature change is suppressed by the diffraction zone structure when a laser diode and a plastic lens are used.

Another advantage of the present invention is that the temperature characteristic of the output of a laser light source or a laser diode module becomes stable due to the diffraction zone structure when a laser diode and a plastics lens are used.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
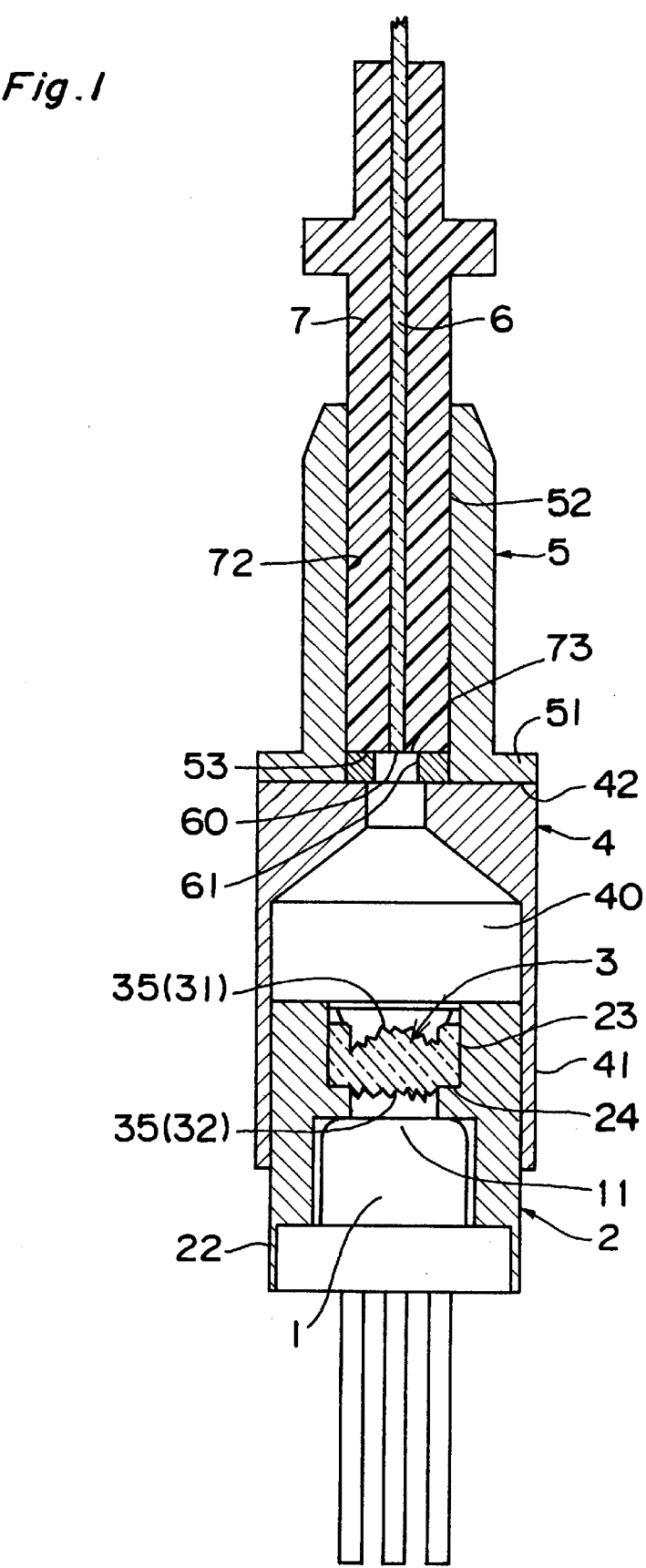
FIG. 1 is a sectional view of a laser diode module of a first embodiment of the invention.

Referring now to the drawings, wherein like reference characters designate like or corresponding parts throughout the several views, FIG. 1 is a sectional view of a laser diode module of a first embodiment of the invention. A lens holder 2 has a throughhole having several steps, and a laser diode 1 is inserted through an opening of the throughhole and fixed therein at the front side of the lens holder 2. On the other hand, a focusing lens 3 is fitted into the throughhole from the other end thereof and fixed with an adhesive agent to the inner surface 23 of the lens holder 2. A hollow cylinder 41 of a connection holder 4 is fitted onto a peripheral outer surface 22 of the lens holder 2.

Further, an incident end 60 of an optical fiber 6 is fixed relative to the connection holder 4 or to the laser diode 1. In this example, the position of the incident end 60 of the optical fiber 6 is detachably fixed with a trapezoidal ferrule 7 for inserting the incident end 60. A ferrule holder 5 fixes the ferrule 7 in a throughhole formed along the axis thereof, and the top end face of the connection holder 4 is connected to an end face of a flange 51 of the ferrule holder 5. A stop step 53 is provided in the throughhole of the ferrule holder 5 in order to stop the incident end 60 of the optical fiber 6. Thus, the incident end 60 of the optical fiber 6 is positioned by inserting the ferrule 7 into the throughhole of the ferrule holder 5. Further, an aperture member 61 is provided at a top end face 73 of the ferrule 7 in order to limit the light intensity entering the incident end 60 of the optical fiber 6. The aperture member 61 is not provided if it is not needed to limit the intensity of the light entering the incident end 60 of the optical fiber.

The optical fiber 6 is a conventional optical fiber narrower than the laser beam, for example, an optical fiber of core diameter of 10–300 μm. It may be a multi-mode or single-mode optical fiber.

Figure 2:
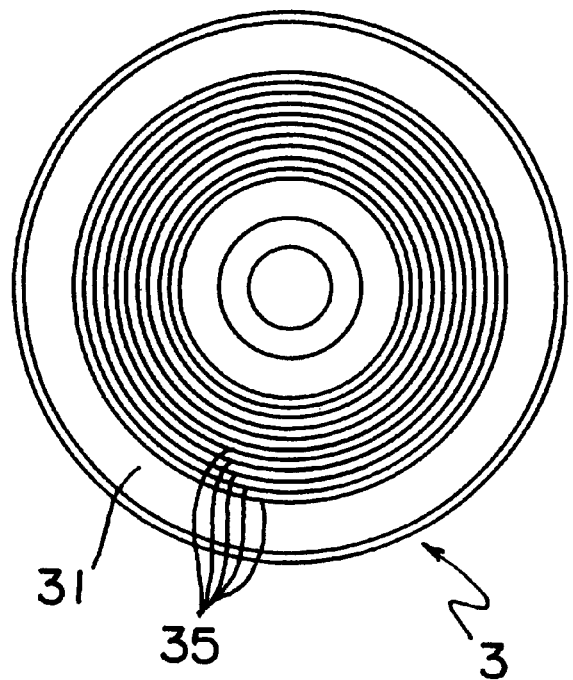
FIG. 2 is a plan view of a focusing lens with diffraction zones for diffraction.
Figure 3:
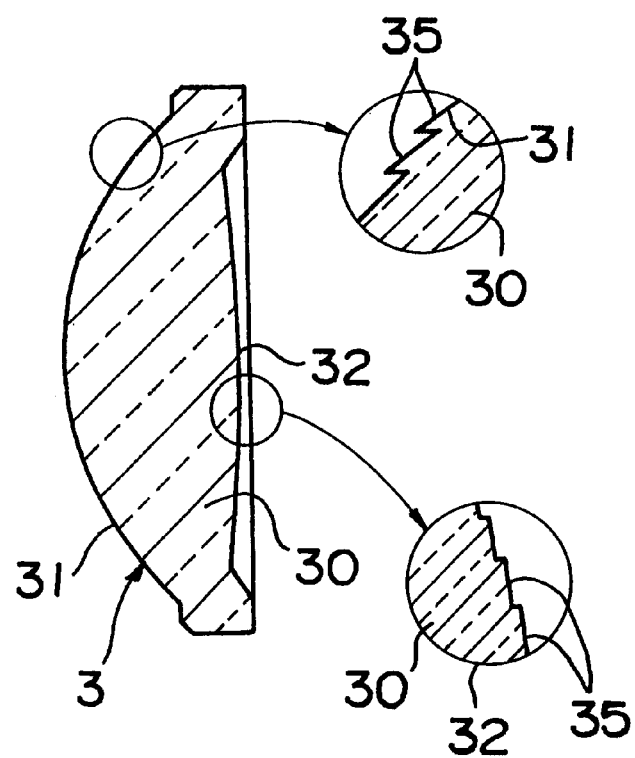
FIG. 3 is a sectional view of the focusing lens with partial enlarged insets.

The focusing lens 3 is a spheric lens or an aspheric lens (i.e., having a curved surface) made of plastics. As shown in FIGS. 2 and 3, concentric diffraction zones 35 are formed on at least one of the two faces 31 and 32 of the focusing lens 3. (The diffraction zones 35 are shown in FIG. 1 greatly exaggerated.) When the laser diode module 1 is fabricated, the connection cylinder 41 of the connection holder 4 is adjusted fore and back relative to the lens holder 2. Therefore, the light emitted from the laser diode 1 and transmitted through the focusing lens 3 is focused precisely at the incident end 60 of the optical fiber 6 at room temperature.

The focusing lens 3 is made of a transparent plastic material which can be molded as a lens. The plastic material may be, for example, acrylic resin, polycarbonate, amorphous polyorefin (available as ® Zeonics) or norbornene resin (available as ® Arton). Such synthetic resin may have a larger thermal expansion coefficient than glass or may have an index of refraction depending largely on temperature.

Next, the structure of the diffraction zones 35 formed in the focusing lens 3 is explained. The diffraction zones 35 having a diffraction effect are formed on the surfaces of the focusing lens 3. The diffraction zones 35 have, for example, a step-like structure having microscopic steps in correspondence to the wavelength of the laser beam. Usually, the heights of the steps relative to the surface of a neighboring diffraction zone are about several micrometers. FIGS. 2 and 3 show an example. As shown in the sectional view of FIG. 3 with insets of partial enlarged portions in FIG. 3, many diffraction zones 35 are arranged on the two curved surfaces of the incoming surface 32 and the outgoing surface 31 of the aspheric lens 30 so as to have microscopic steps between adjacent diffraction zones. As shown in the plan view of FIG. 2, the diffraction zones 35 are adjacent to each other concentrically relative to the optical axis of the laser beam, and the surfaces of the diffraction zones 35 form a desired lens surface having a curved refraction surface as a whole. Though concentric diffraction zones are used in this embodiment, they may be elliptic for a laser diode having non-circular light distribution.

The focusing lens 3 focuses the laser beam at the incident end 60 of the fiber due to the diffraction thereof of the spheric lens or the aspheric lens. Further, the diffraction zones 35 on the focusing lens 3 focus the laser beam at the end 60 due to the diffraction effect causes thereby.

Figure 4:
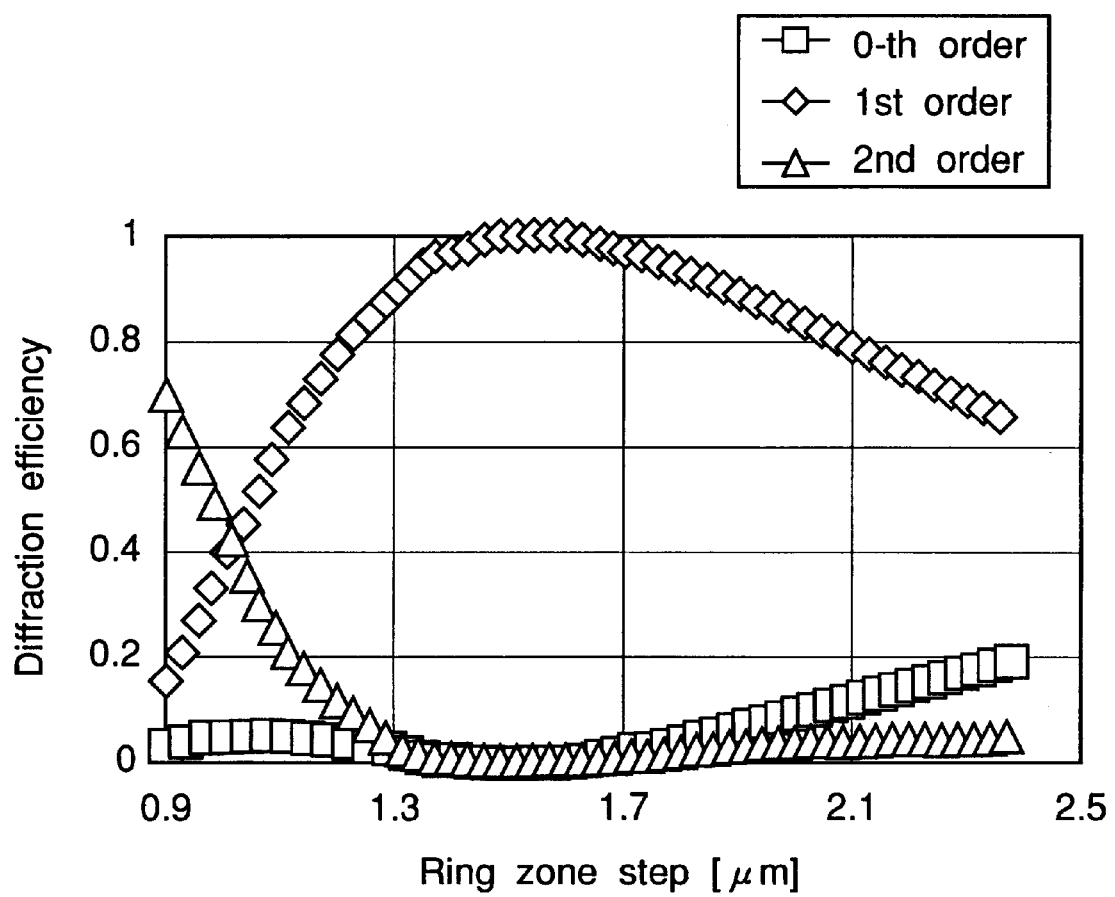
FIG. 4 is a graph of diffraction efficiency of a diffraction lens.

The incident light on the focusing lens 3 is dispersed by the diffraction zone structure to a plurality of orders of diffraction light. The diffraction light of given orders is focused at the incident end 60 of the optical fiber 6. The focusing lens 3 is designed so as to focus the diffraction light at the end 60 of the optical fiber. The light intensity of the diffracted light used for optical fiber coupling (diffraction efficiency) depends on the sectional shape of the diffraction zones 35 and the distances between them. For example, if the diffraction zones 35 have triangular patterns, the light intensity depends on the amplitude of the phase difference of the light generated by the diffraction zones according to the wavelength of the laser beam and on the sectional shape of the step-like diffraction zones. Therefore, the size and the sectional shape of the diffraction zones are selected to obtain a given diffraction efficiency. FIG. 4 shows an example of the relationship of the diffraction efficiency of zeroth to second order diffraction lights of a laser beam of wavelength of 780 nm to the heights of the steps of diffraction zones of 0.9 to 2.5 μm. The diffraction zones of this example have a shape of triangular pattern, and the height means the height of each triangle. The diffraction efficiency varies between 1 and 0 with the step. The sectional shape of the diffraction zones is, for example, saw-tooth like, stairway-like trapezoidal or with round edges. Because the sectional shape is restricted by a fabrication process of the lens, an appropriate shape is given for a selected fabrication process.

A laser diode emits a light beam whose wavelength depends on temperature. The focal position of the diffraction zones 35 depends on the wavelength of the light. For example, if the wavelength becomes longer, the distance between the diffraction zones 35 becomes substantially narrower for the laser beam. Thus, the diffraction angle becomes larger and the focal distance becomes shorter. On the contrary, if the wavelength becomes shorter, the focal distance becomes longer.

Figure 5:
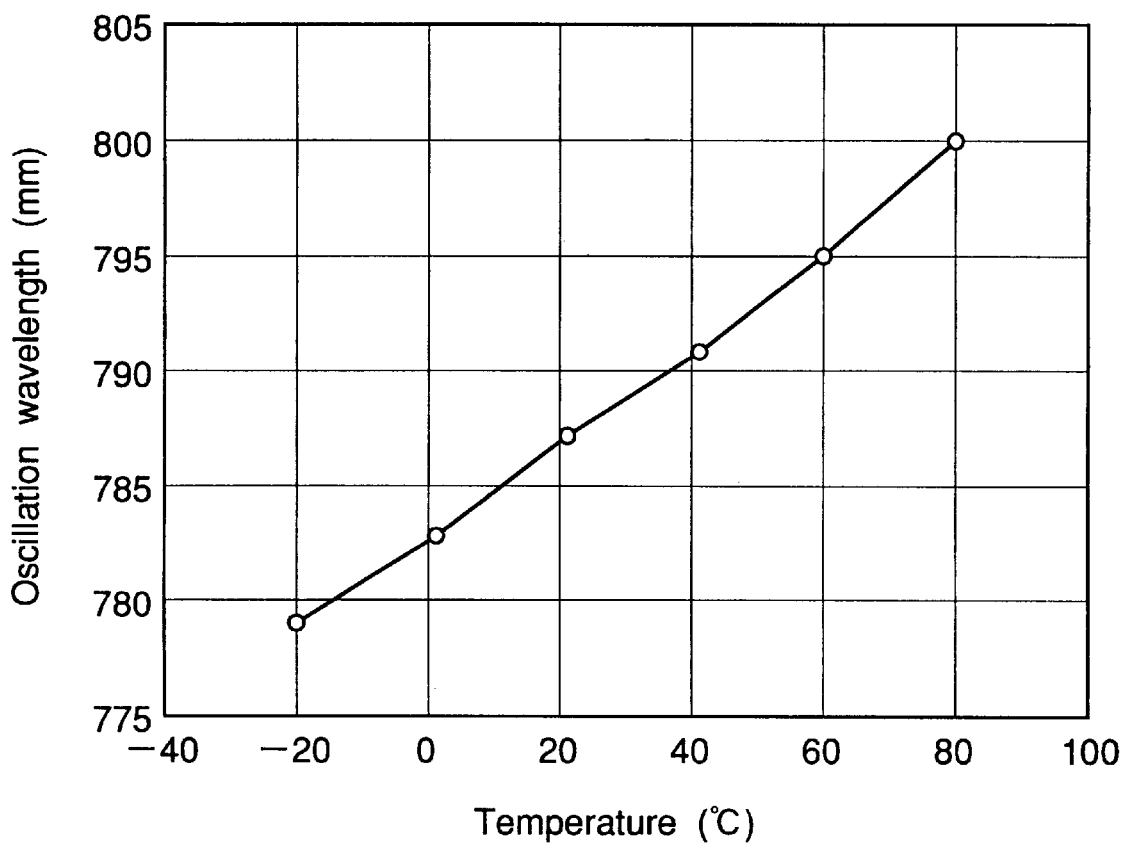
FIG. 5 is a graph of temperature characteristics of an oscillation wavelength of the laser diode.

Then, the laser diode 1 is selected to have suitable temperature dependence of its oscillation wavelength. FIG. 5 shows an example of the temperature dependence of oscillation wavelength of the laser diode. The oscillation wavelength becomes longer with an increase in temperature. The laser diode 1 is, for example a long wavelength laser of InP in 1.2–1.6 $\mu$m wavelength band, a laser diode of 0.98 $\mu$m wavelength band, or a laser of GaAsAl of 0.78 $\mu$m wavelength band. The laser diode is not limited as far as the oscillation wavelength shifts with temperature.

The structure of the diffraction zones and the distances between diffraction zones are designed so that the focal position is shifted due to a change in the index of refraction, and so that thermal expansion or contraction occurs in a direction different from that due to temperature change in oscillation wavelength of the oscillator. The diffraction zones can be designed so that the two shifts of focal position cancel each other completely. The number of diffraction zones is determined by the distances between diffraction zones, the size of the lens, and the like.

By using the laser diode module including the focusing lens 3 with the diffraction zone structure, when temperature rises, the index of refraction of the plastic material of the lens 3 is decreased and the plastic is expanded, so that the focal length becomes longer. On the other hand, as mentioned above, because the oscillation wavelength of the oscillator 1 becomes longer, the focal distance becomes shorter inversely due to the diffraction effect of the diffraction zones. The shift of focal position can be canceled by the above-mentioned two actions so as to suppress a change in the focal position at the incident end of the optical fiber. Thus, a fluctuation in the output light from the optical fiber is suppressed. On the other hand, when the temperature decreases, the shift of focal position is also suppressed by reasons reverse to the above-mentioned ones.

Figure 6:
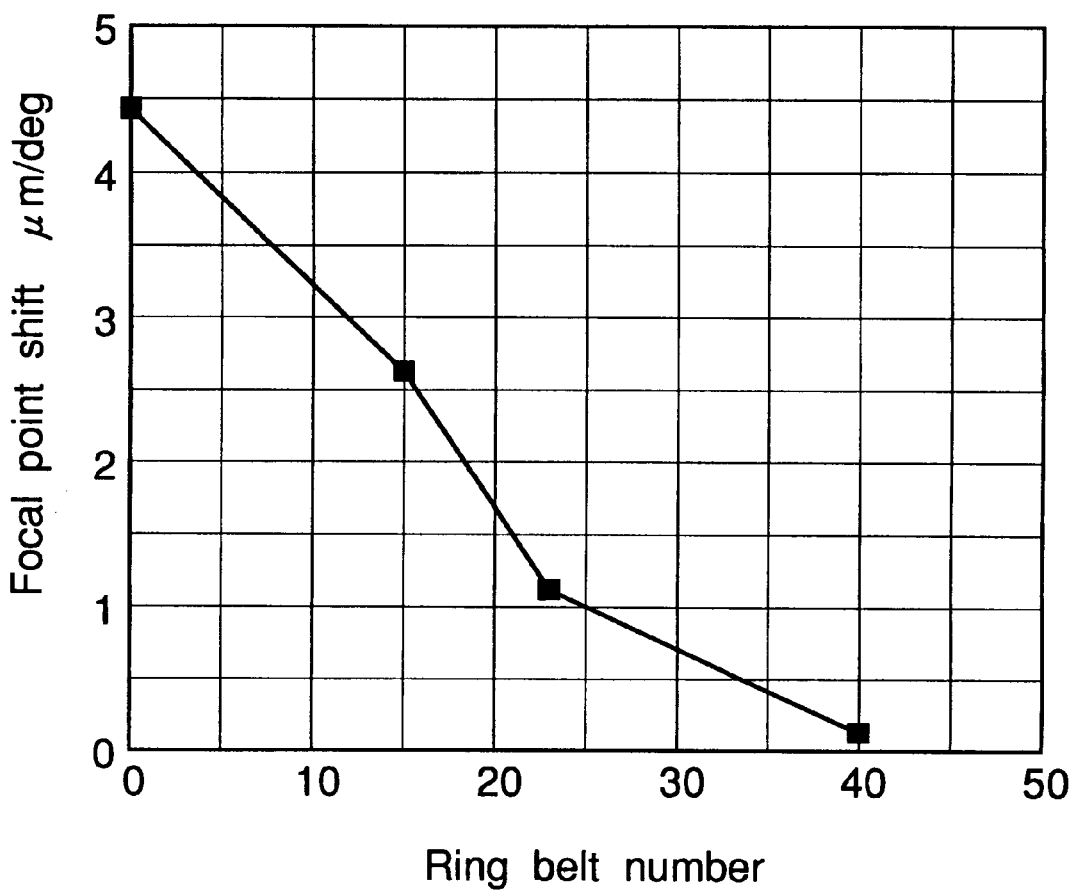
FIG. 6 is a graph of the shift of focal position plotted against the number of diffraction zones formed on the focusing lens.

In an example, the focusing lens 3 is made of amorphous polyorefin, the lens diameter is 1 mm, and the laser diode 1 uses a GaAlAs laser diode of oscillation wavelength of 780 nm. FIG. 6 shows a relation between the focal position shift to the number of the diffraction zones for a lens of effective radius of 1 mm. The shift of focal position decreases as the number of the diffraction zones 35 increases. Thus, the number of the diffraction zones 35 is determined so that the shift becomes substantially zero. The shift of focal position can be canceled as shown in FIG. 6 when the structure of the diffraction zones 35 of the lens 3 is set so that the number of diffraction zones is 40 and the minimum distance of the diffraction zones is 6 $\mu$m. FIG. 6 shows a result when the diffraction zones are formed on one surface of the lens.

Figure 7:
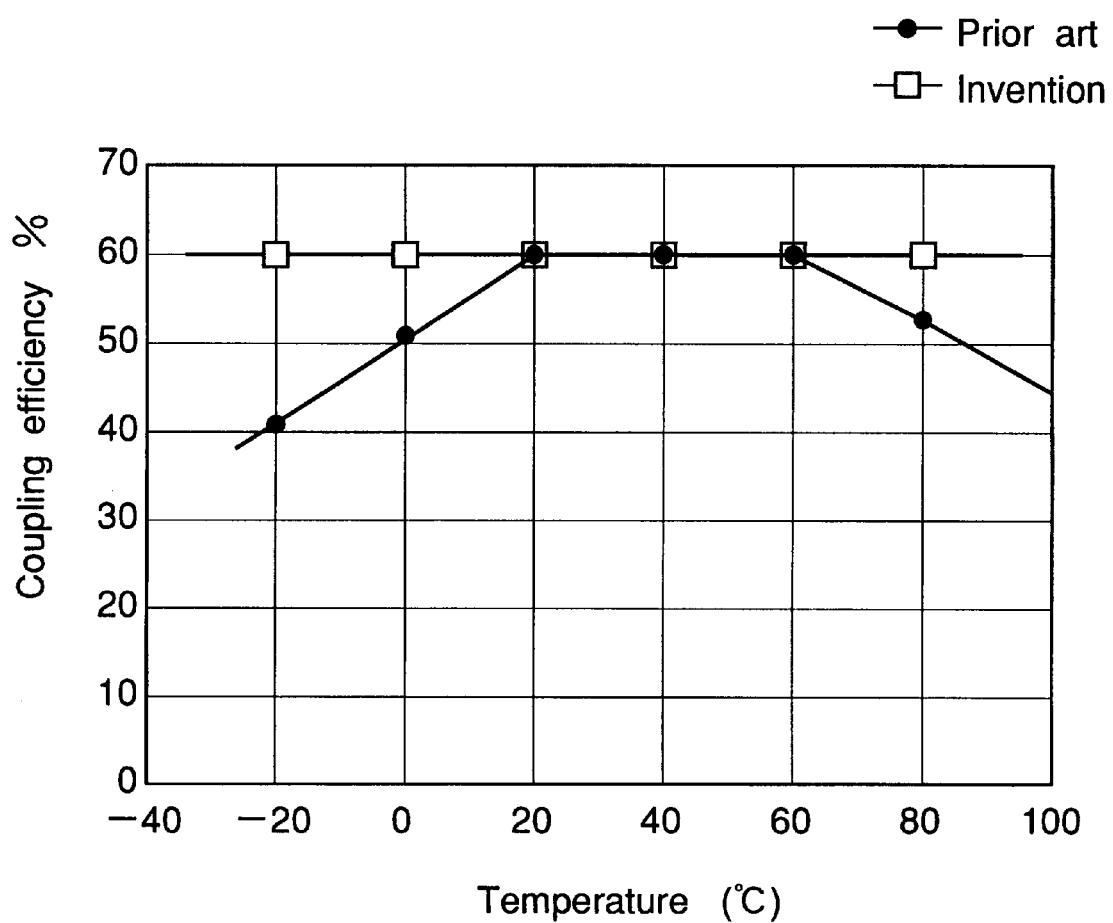
FIG. 7 is a graph of temperature dependence of coupling efficiency of the laser diode module to the optical fiber.

If the module is fabricated so as to be combined with the optical fiber 6 of core diameter of 50 $\mu$m in the above-mentioned conditions, as shown in FIG. 7, the optical coupling efficiency can be kept substantially constant between –20 and 80° C. at the efficiency at room temperature. In FIG. 7, black circles represent data with the focusing lens having no diffraction zones (prior art), wherein the coupling efficiency has temperature dependence or it decreases at high temperatures and low temperatures.

The aperture member 61 provided at the top end 73 of the ferrule 7 decreases an effect of diffraction lights of other orders not used for coupling with the optical fiber 6. The intensities of diffraction lights of a plurality of orders are determined by the sectional shape of the diffraction zones 35 and the distances between the diffraction zones 35. Therefore, the optical intensity of the diffraction lights of the orders used for focusing are controlled by the diffraction zones 35. The diffraction lights of the orders not used for coupling are focused at points other than the end 60 of the optical fiber 6. By providing the aperture member 61 of an appropriate size around the end 60 of the optical fiber 6, the diffraction lights of the orders not used for coupling are diffused inside the module without radiating to the outside. Then, only the desired light intensity is focused on the end 60 of the optical fiber, and the output optical intensity can be limited below a predetermined value.

The diffraction efficiency is 20% by setting the steps of the diffraction zones to about 1 $\mu$m, and the optical output from the module can be limited to about 20% by providing the aperture member 61 with an inner diameter of 1 to 0.6 mm near the end 60 of the optical fiber. Because the diffracted lights of orders not contributed to focusing are largely dispersed, they pass the aperture plane only a little, and there is substantially no transmittance dependence of the non-focused light on the size of the aperture member 61. Therefore, the precision of the size and the shape of the aperture member 61 and the position thereof are easily determined.

The structure of the diffraction zones of the focusing lens 3 are determined by considering the properties of the material of the lens, various specifications of the lens 3 and the temperature characteristic of the laser diode 1 so that the focused light of a given light intensity is focused within a desired shift range. For example, if the lens material is amorphous polyorefin and the effective diameter of the lens is 1 mm, it is desirable that the number of diffraction zones of the lens is 10 to 50 and the minimum distance between diffraction zones is 5 to 20 $\mu$m for a laser diode of shorter wavelengths of near infrared range or visible light range. It is desirable that the number of diffraction zones of the lens is 5 to 50 and the minimum distance between diffraction zones is 5 to 40 $\mu$m for a laser diode of longer wavelengths of infrared range.

Figure 8:
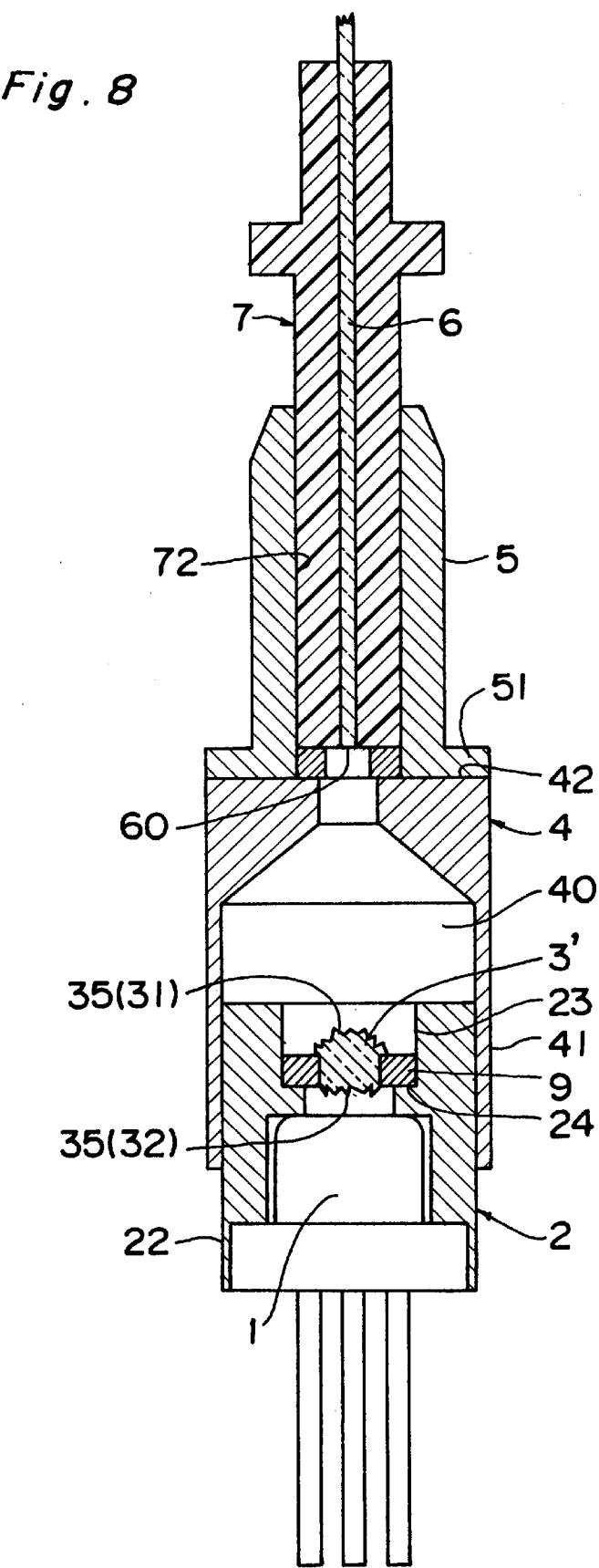
FIG. 8 is a sectional view of a laser diode module of a modified example of the first embodiment of the invention.
Figure 9:
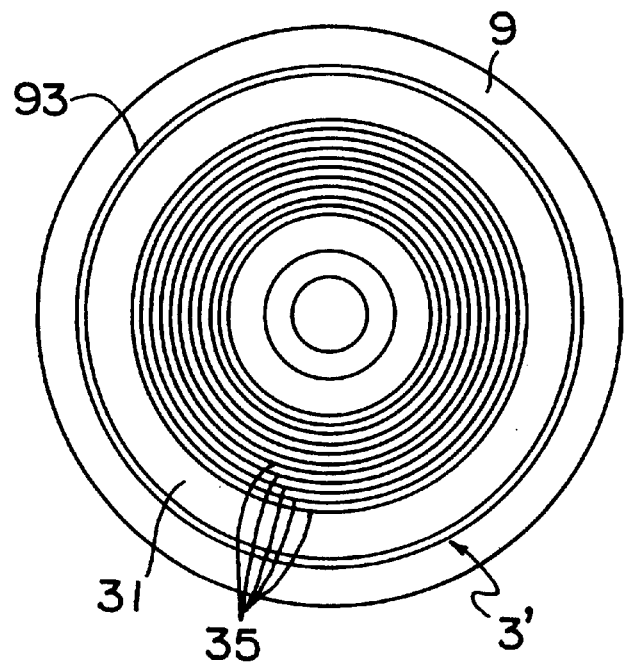
FIG. 9 is a plan view of a focusing lens with diffraction zones of a modified example of laser diode module of the first embodiment.
Figure 10:
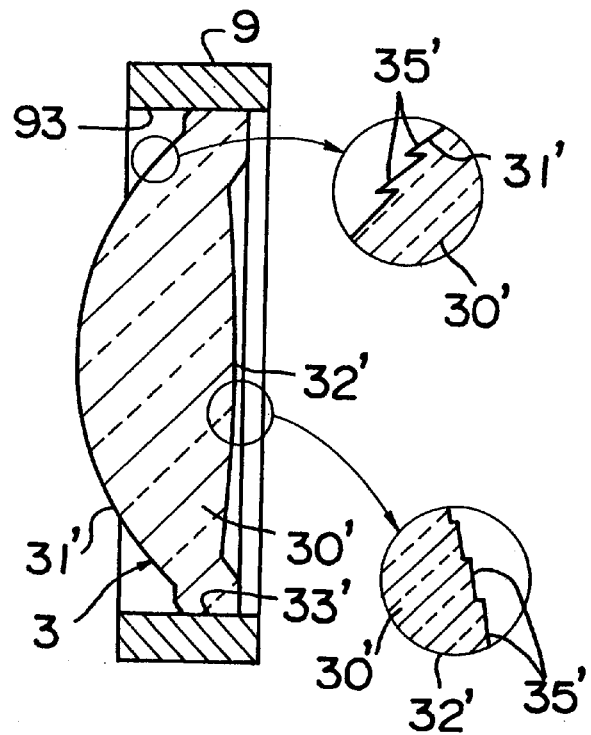
FIG. 10 is a sectional view of the focusing lens with partial enlarged insets of the modified example of laser diode module.

FIG. 8 shows the focusing lens of a laser diode module of a modified example. The focusing lens 3' is made of a plastic material, and a circular metallic frame 9 as shown in FIGS. 9 and 10 is provided for the main body 30' having diffraction zones 35' on the two surfaces. The focusing lens 3' is inserted in the lens holder 2, and the metallic frame 9 is fixed so as to contact a step 24 of the hollow portion of the lens holder 2. This modified example is the same as the example shown in FIG. 1 except that the focusing lens 3' integrated with the metallic frame 9 is used.

It is preferable that the outer periphery of the lens 3' is fixed at the inside of the metallic frame 9. The lens 3' and the metallic frame 9 are preferably integrated as one body. FIGS. 9 and 10 show an example of the focusing lens 3' formed with diffraction zones 35' at two surfaces 31' and 32' within the circular metallic frame 9. The outer periphery of main body 30' of the lens 3' is fixed to the inner periphery of the metallic frame 9, and when the lens is fabricated, the main body 30' is formed in the metallic frame 9 under heat and pressure. Because the lens main body is integrated with the metallic frame 9, it can be fixed directly with welding to the lens holder 2, so the assembly step becomes easier than the prior art adhesion step and the reliability is increased. If the metallic frame is integrated with the lens holder, the lens main body can be formed directly with the integrated lens holder.

Figure 11:
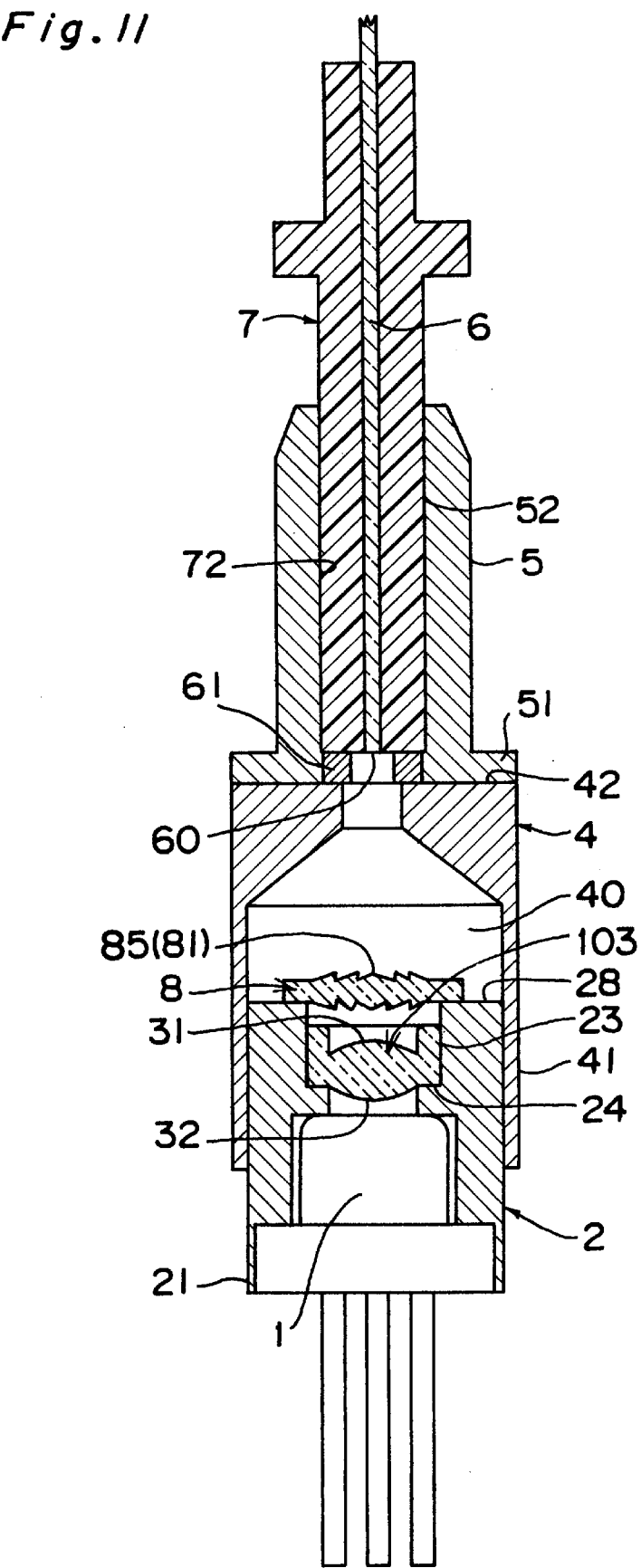
FIG. 11 is a sectional view of a laser diode module of a second embodiment of the invention.

FIG. 11 shows a laser diode module of the second embodiment of the invention. The laser diode module uses a planer diffraction lens 8 having diffraction zones on two surfaces thereof between a spheric or aspheric focusing lens 103 and the incident end 60 of the optical fiber. The focal position is moved due to changes in the index of refraction and thermal expansion or contraction of the focusing lens 103. However, the oscillation wavelength of the laser diode also depends on temperature. Then, the focal position of the laser beam propagating through the focusing lens and the planer diffraction lens is moved in the reverse direction due to the diffraction angles depending on wavelength. The two shifts of focal position cancel each other to decrease the movement of the focal position.

In the laser diode module shown in FIG. 11, the outer periphery of the planer diffraction lens 8 for temperature compensation is fixed to a periphery of the top end 28 of the lens holder 2, and diffraction zones 85 are formed on the two surfaces of the planer diffraction lens 8. A focusing lens 103 is an aspheric lens having smooth surfaces without diffraction zones. The lens holder 2, the connection holder 4 and the ferrule holder 5 are adjusted, as in the laser diode module shown in FIG. 1, so that a laser beam emitted from the laser diode 1 and transmitted through the focusing lens 103 and the planer diffraction lens 8 is focused correctly at the incident end 60 of the optical fiber 6. The laser diode module is the same as that shown in FIG. 1 except the focusing lens 103 without diffraction zones and the planer diffraction lens 8 with diffraction zones.

In this embodiment, the focusing lens 103 is a lens made of a plastic material and which has smooth spheric or aspheric surfaces. The planer diffraction lens 8 having concentric multiple diffraction zones 85 is provided between the focusing lens 103 and the incident end 60 of the optical fiber 6. The planer diffraction lens 8 can be made of glass, but it is preferably made of a plastic material because microscopic structure of the diffraction zones 85 can be precisely molded at a low cost. A synthetic resin which can be used for the focusing lens is selected as the plastic material for the planer diffraction lens 8.

The diffraction zones 85 are formed concentrically on one or two surfaces 81 of the planer diffraction lens 8. The surface of the diffraction zone 85 has microscopic steps of several micrometers relative to the adjacent diffraction zone according to the wavelength of the laser beam. The structure of the diffraction zones 85 and the distance between diffraction zones are designed so that the shift of focal position due to a change in the index of refraction and thermal expansion or contraction is in an opposite direction from that due to temperature change in oscillation wavelength of the laser diode 1, as in the above-mentioned first embodiment for the focusing lens. Preferably, the diffraction zones can be designed so that the complex shift of focal position becomes smaller than a certain level. More preferably, the two shifts of focal position cancel each other completely.

The planer diffraction lens 8 generates diffraction lights of many orders, and only specified orders thereof are focused on the end 60 of the optical fiber. Similar to the first embodiment, by providing an aperture member 61 between the end 60 of the optical fiber and the planer diffraction lens 8, the light which does not contribute to optical coupling is prevented from leaking to the outside of the module. The light intensity and diffraction efficiency of each diffracted light are determined by the sectional shape of the diffraction zone structure and the distance between the diffraction zones of the planer diffraction lens. Therefore, a desired optical output of the module can be obtained by controlling the sectional shape of the diffraction zone structure and the distance between the diffraction zones.

A desired diffraction efficiency can be obtained according to the size of the steps and the shape of the diffraction zone structure in correspondence to the wavelength of the laser beam to be used. The optical output supplied from the module is limited below a predetermined value by coupling a predetermined optical intensity to the optical fiber 6 and by providing the aperture member 61 of a diameter of 1–0.6 mm near the incident end 60 of the fiber.

The planer diffraction lens 8 does not need to be located between the focusing lens 103 and the end 60 of the optical fiber 8, but may instead be located between the laser diode 1 and the focusing lens 103. The shift of the focal position due to temperature change can also be suppressed in this location or canceled completely.

In this embodiment, the planer diffraction lens 8 is provided in addition to the prior art focusing lens 103 having smooth surfaces. Therefore, advantages similar to those of the first embodiment can be realized easily by adding the planer diffraction lens 8 to the known optical system.

Figure 12:
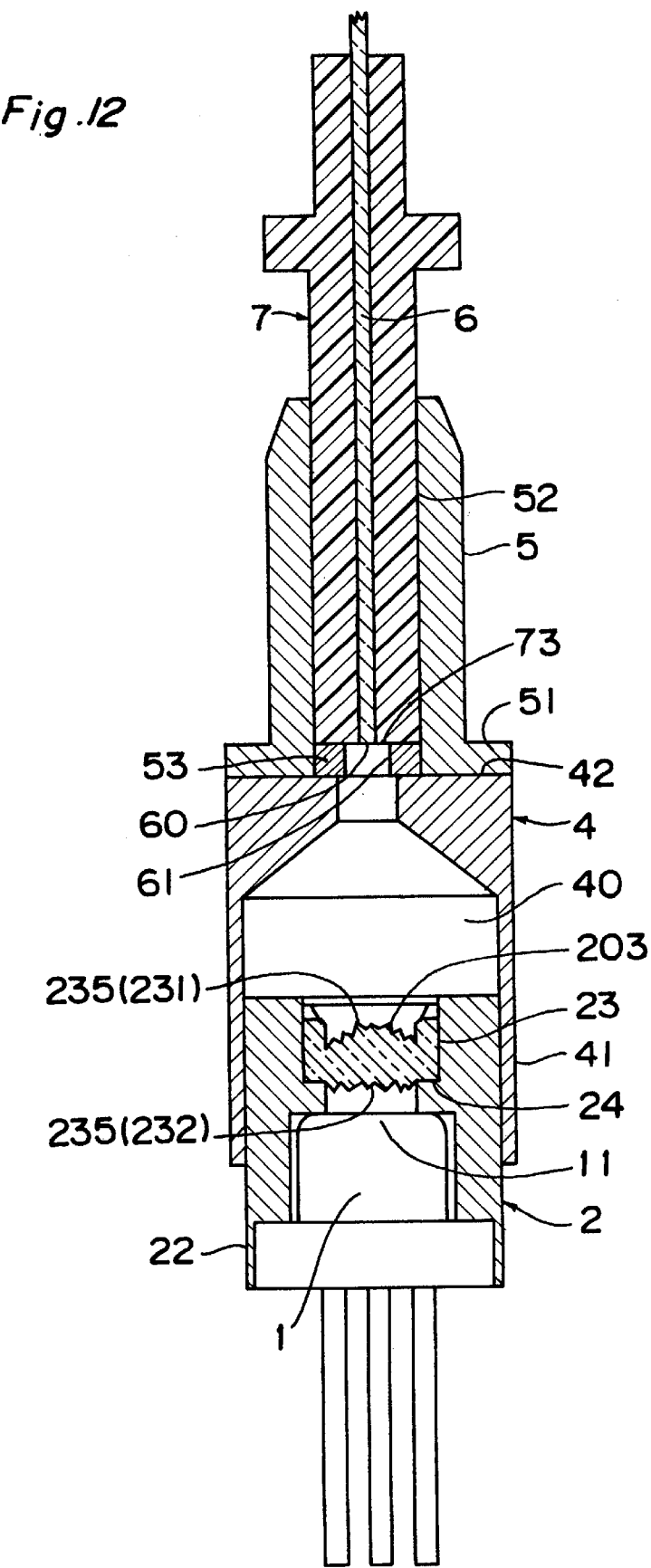
FIG. 12 is a sectional view of a laser diode module of a third embodiment of the invention.

Next, a laser diode module according to a third embodiment of the invention is explained. The basic structure of the laser diode module is similar to those of the first and second embodiments in that the diffraction zone structure is formed on the focusing lens or the planer diffraction lens for temperature compensation. A characteristic of this embodiment is that the output light intensity from the module is limited by adding additives into the resin material of plastic. FIG. 12 shows an example of the laser diode module of the third embodiment of the invention. Similar to the structure of the laser diode module of the first embodiment, many diffraction zones 235 are formed at two surfaces 231, 232 of the in-coming and out-going surfaces of the asymmetric lens so as to have microscopic steps between adjacent diffraction zones. Advantages of the structure are similar to those of the third embodiment. This embodiment is different from the first embodiment in that additives are added to the plastic material of the focusing lens 203, so that the transmittance of the focusing lens 203 is decreased to a predetermined value. It is an advantage that the transmittance of the lens 203 is decreased easily below a particular value, because the output level of the laser diode module can be limited when a desired diffraction efficiency cannot be obtained due to restrictions for forming the diffraction zones.

Though the diffraction zones are formed on the focusing lens in the example shown in FIG. 12, they may be formed alternatively on the planer diffraction lens as in the second embodiment.

Figure 13:
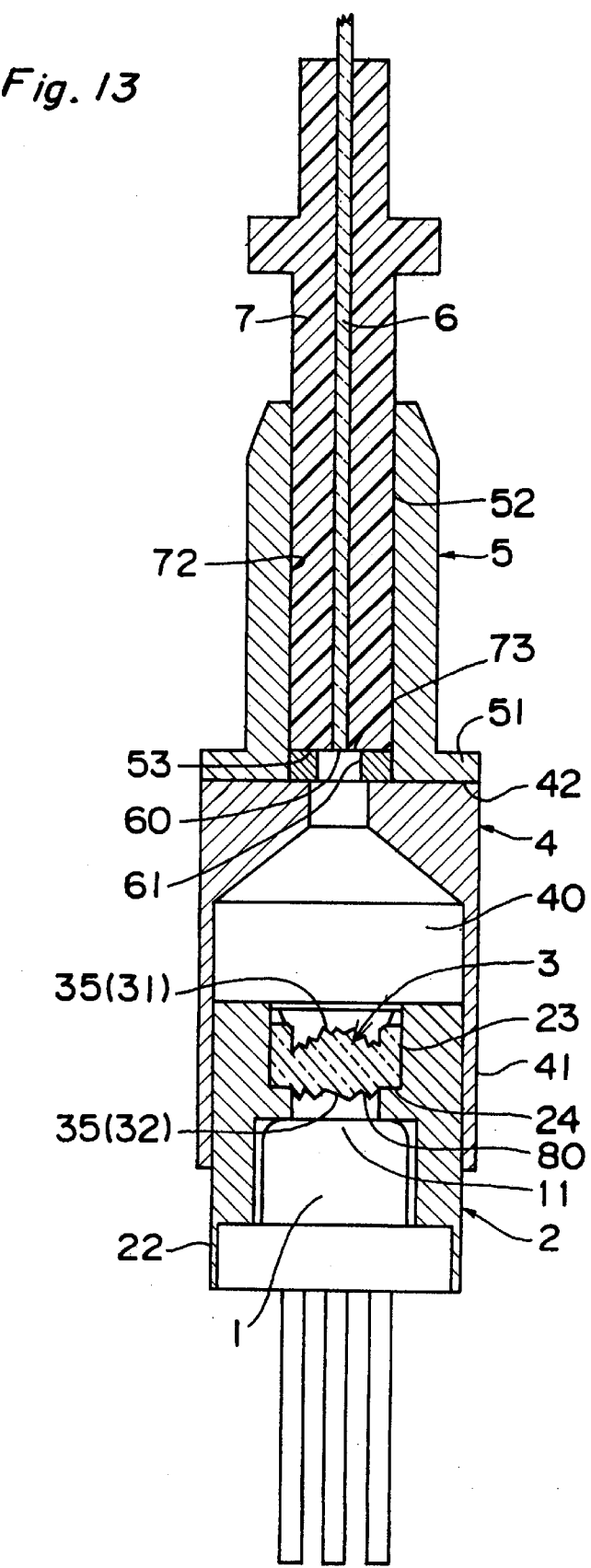
FIG. 13 is a sectional view of a laser diode module of a fourth embodiment of the invention.

Next, a laser diode module according to a fourth embodiment of the invention is explained. The basic structure of the laser diode module is similar to those of the first and second embodiments in that the diffraction zone structure is formed on the focusing lens or the planer diffraction lens for temperature compensation. FIG. 13 is a sectional view of an example of the laser diode module of the fourth embodiment of the invention. The structure and advantages of the laser diode module of the fourth embodiment are similar to those of the first embodiment, but a light-attenuating film 80 for attenuating the laser beam is formed on a surface of the focusing lens 3. The light-attenuating film 80 limits the intensity of the laser beam from the laser diode 1, and it decreases the transmittance to a predetermined value. Though the light-attenuating film 80 is formed on the focusing lens in the example shown in FIG. 13, a planer diffraction lens may be provided as in the second embodiment and the light-attenuating film 80 may be formed on the planer diffraction lens. By forming the light-attenuating film of a predetermined transmittance on the focusing lens or on the planer diffraction lens, the output level of the laser beam from the laser diode 1 can be limited easily. Because the anti-reflection film has a function to prevent reflection, unnecessary returning light to the laser diode can be suppressed. Because the light-attenuating film has an anti-reflection function, unnecessary light can be suppressed to return to the laser diode.

In the laser diode modules of the first to fourth embodiments, an optical isolator (not shown) may be inserted at an appropriate position in the middle of the optical path for removing the returning light.

Figure 14:
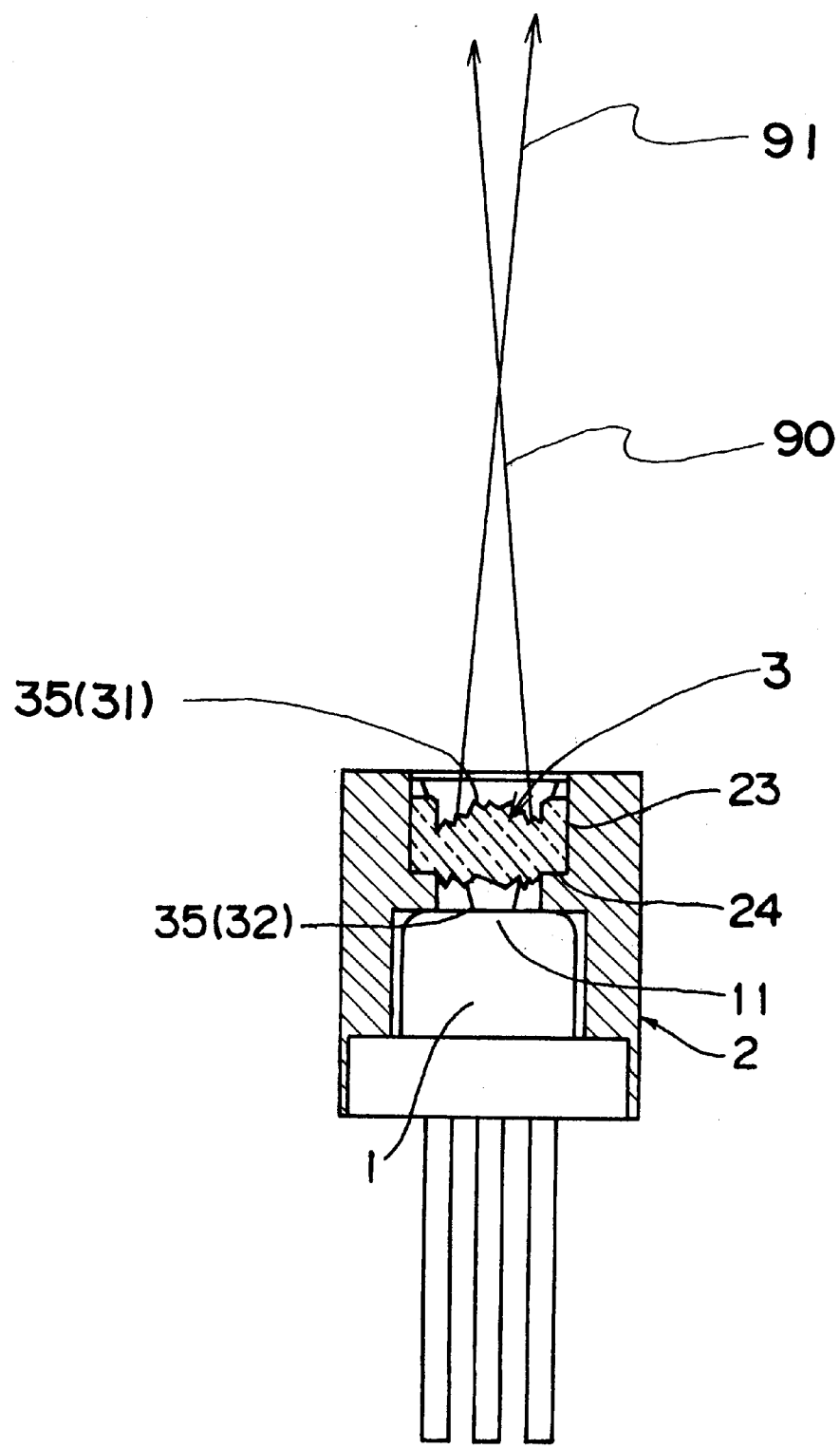
FIG. 14 is a sectional view of an example of a laser light source of a fifth embodiment of the invention.
Figure 15:
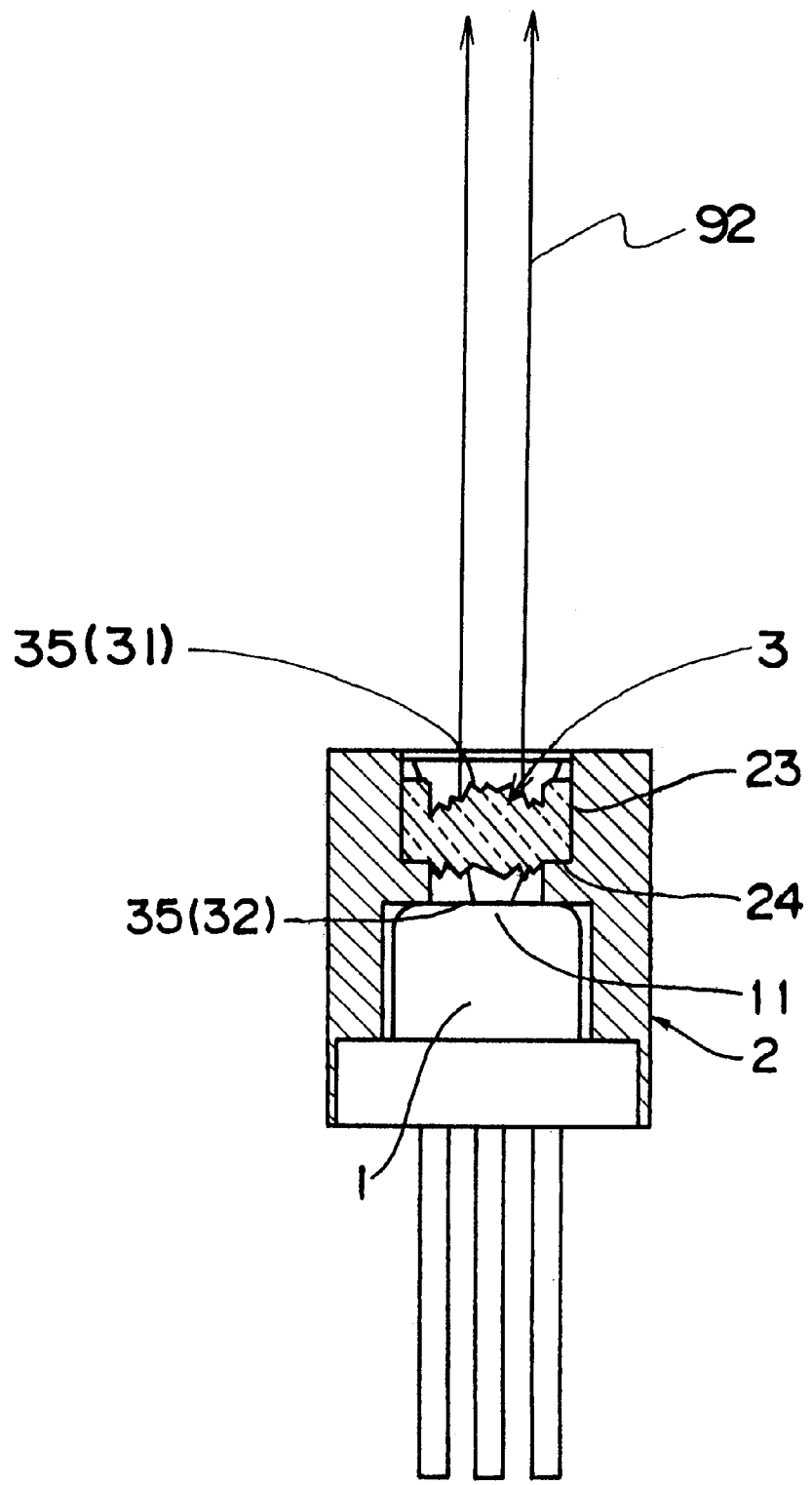
FIG. 15 is a sectional view of another example of the laser light source of the fifth embodiment of the invention.

Next, a laser diode light source according to a fifth embodiment of the invention is explained. FIGS. 14 and 15 show two examples of the laser light source of the fifth embodiment of the invention. The basic structure of the laser diode light source is similar to the counterparts of the first embodiment in that the diffraction zones 35 are formed on a focusing lens 3 for temperature compensation. A laser diode 1 is inserted into a throughhole of a lens holder 2 and fixed therein at the front side of the lens holder 2. On the other hand, the focusing lens 3 is fitted into the lens holder 2 from the other end thereof and fixed with an adhesive agent to the inner surface 23 of the lens holder 2.

The structure and advantages of the laser diode module of the fifth embodiment are similar to those of the first embodiment on the diffraction zones, but the transmitting laser beam 91, 92 is output without being coupled to the optical fiber. In the example shown in FIG. 14, the position of the focal position 90 is finite. In the other example shown in FIG. 15, the position of the focal position is infinite, and a collimated laser beam is output. A laser light source of this embodiment is used not only for communication, but also for a light source of a light communication apparatus for space transmission, a light pickup, an optical disk drive, a printer, a scanner or an optical sensor, or an apparatus which uses the light source.

Figure 16:
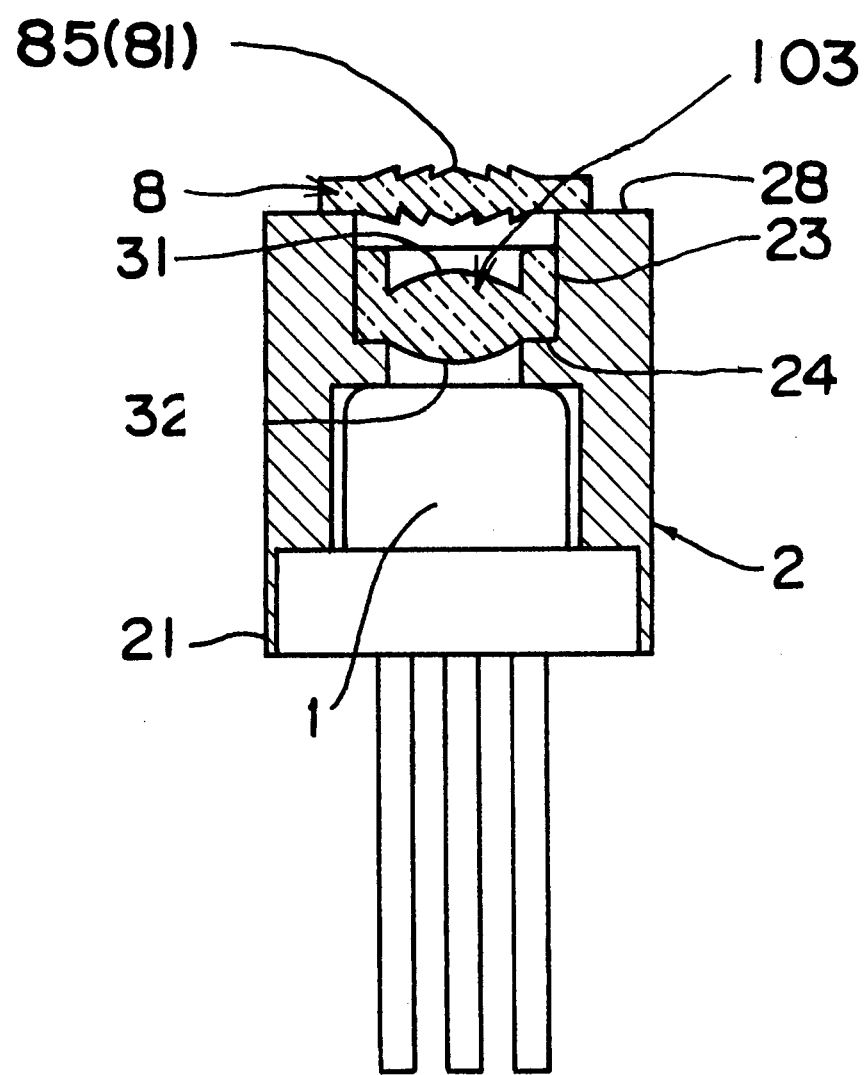
FIG. 16 is a sectional view of an example of a laser light source of a sixth embodiment of the invention.

FIG. 16 shows an example of a laser light source of a sixth embodiment of the invention. The basic structure of the laser diode light source is similar to the counterparts of the second embodiment in that the diffraction zone structure is formed on the planer diffraction lens 8 for temperature compensation. Similar to the fifth embodiments, a focusing or collimating laser beam may be output without being coupled to the optical fiber.

In the first to sixth embodiments, components such as the lens holder, the connection holder or the ferrule holder are made of a metallic material, but they may also be made of a plastic material. In this case, the focusing lens and the lens holder may be formed as an integral body.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser diode module comprising:

a laser diode for emitting a laser beam;

a focusing lens for focusing the laser beam emitted by said laser diode, said focusing lens having a first surface and a second surface opposite said first surface, said focusing lens having diffraction zones formed on at least one of said first surface and said second surface, said diffraction zones having a shape and being spaced apart such that a focal position shift of the laser beam due to a change in oscillation wavelength of said laser diode due to a temperature change is in an opposite direction to a focal position shift of the laser beam due to thermal expansion or thermal contraction of said focusing lens and an index of refraction of said focusing lens; and a holder holding said laser diode, said focusing lens, and an end of an optical fiber along an optical axis of the laser beam emitted by said laser diode, wherein said holder holds the end of the optical fiber at a predetermined position, and wherein said focusing lens is positioned to transmit the laser beam emitted from said laser diode and focus the laser beam onto the end of the optical fiber.

2. The module of claim 1, wherein said diffraction zones have a shape and are spaced apart such that a total focal position shift of the laser beam is less than a predetermined value.

3. The module of claim 2, wherein said diffraction zones have a shape and are spaced apart such that a total focal position shift of the laser beam is substantially zero.

4. A laser diode module comprising:

a laser diode for emitting a laser beam;

a focusing lens for focusing the laser beam emitted by said laser diode;

a planer diffraction lens for transmitting the laser beam transmitted through said focusing lens, said planer diffraction lens having a first surface and a second surface opposite said first surface, said planer diffraction lens having concentric diffraction zones formed on at least one of said first surface and said second surface, said diffraction zones having a shape and being spaced apart such that a focal position shift of the laser beam due to a change in oscillation wavelength of said laser diode due to a temperature change is in an opposite direction to a focal position shift of the laser beam due to thermal expansion or thermal contraction of said planar diffraction lens and an index of refraction of said focusing lens; and a holder holding said laser diode, said focusing lens, and an end of an optical fiber along an optical axis of the laser beam emitted by said laser diode, wherein said holder holds the end of the optical fiber at a predetermined position, and wherein said focusing lens is positioned to focus the laser beam transmitted through said focusing lens and said planer diffraction lens onto the end of the optical fiber.

5. The module of claim 4, wherein said diffraction zones have a shape and are spaced apart such that a total focal position shift of the laser beam is less than a predetermined value.

6. The module of claim 5, wherein said diffraction zones have a shape and are spaced apart such that a total focal position shift of the laser beam is substantially zero.

7. A laser light source comprising:

a laser diode for emitting a laser beam;

a lens for transmitting the laser beam emitted by said laser diode, said lens having a first surface and a second surface opposite said first surface, said focusing lens having diffraction zones formed on at least one of said first surface and said second surface, said diffraction zones having a shape and being spaced apart such that a focal position shift of the laser beam due to a change in oscillation wavelength of said laser diode due to a temperature change is in an opposite direction to a focal position shift of the laser beam due to thermal expansion or thermal contraction of said lens and an index of refraction of said focusing lens; and a holder holding said laser diode and said focusing lens.

8. The module of claim 7, wherein said diffraction zones have a shape and are spaced apart such that a total focal position shift of the laser beam is less than a predetermined value.

9. The module of claim 8, wherein said diffraction zones have a shape and are spaced apart such that a total focal position shift of the laser beam is substantially zero.

10. A laser diode module comprising:

a laser diode for emitting a laser beam;

a focusing lens for focusing the laser beam emitted by said laser diode, said focusing lens having a first surface and a second surface opposite said first surface, at least one of said first surface and said second surface having a curved configuration and having diffraction zones formed thereon, said diffraction zones having a shape and being spaced apart such that a focal position shift of the laser beam due to a change in oscillation wavelength of said laser diode due to a temperature change is in an opposite direction to a focal position shift of the laser beam due to thermal expansion or thermal contraction of said lens and an index of refraction of said focusing lens; and a holder holding said laser diode, said focusing lens, and an end of an optical fiber along an optical axis of the laser beam emitted by said laser diode, wherein said holder holds the end of the optical fiber at a predetermined position, and wherein said focusing lens is positioned to transmit the laser beam emitted from said laser diode and focus the laser beam onto the end of the optical fiber.

11. The module of claim 10, wherein said at least one of said first surface and said second surface has a spherical or an aspherical configuration.

12. The module of claim 10, further comprising an aperture member at the end of the optical fiber, wherein said aperture member is shaped so as to partially block transmission of the laser beam transmitted through said focusing lens onto the end of the optical fiber.

13. The module of claim 10, wherein said focusing lens comprises a single lens.

14. The module of claim 10, further comprising a metal frame, wherein said focusing lens is integrated with said metal frame so as to form a lens member, said lens member being mounted in said holder.

15. The module of claim 10, wherein said focusing lens is formed of one of amorphous polyorefin, acrylic resin, polycarbonate, and norbornene resin.

16. The module of claim 10, wherein said focusing lens is formed of a plastic material including light-absorbing material.

17. The module of claim 10, further comprising a light-absorbing film disposed on one of said first surface or said second surface of said focusing lens.

18. A laser diode module comprising:

a laser diode for emitting a laser beam;

a focusing lens for focusing the laser beam emitted by said laser diode, said focusing lens having a first surface and a second surface opposite said first surface, said first surface and said second surface having a curved configuration;

a planer diffraction lens for transmitting the laser beam transmitted through said focusing lens, said planer diffraction lens having a first surface and a second surface opposite said first surface, said planer diffraction lens having concentric diffraction zones formed on at least one of said first surface and said second surface, said diffraction zones having a shape and being spaced apart such that a focal position shift of the laser beam due to a change in oscillation wavelength of said laser diode due to a temperature change is in an opposite direction to a focal position shift of the laser beam due to thermal expansion or thermal contraction of said lens and an index of refraction of said focusing lens; and a holder holding said laser diode, said focusing lens, and an end of an optical fiber along an optical axis of the laser beam emitted by said laser diode, wherein said holder holds the end of the optical fiber at a predetermined position, and wherein said focusing lens is positioned to focus the laser beam transmitted through said focusing lens and said planer diffraction lens onto the end of the optical fiber.

19. The module of claim 18, wherein said first surface of said focusing lens and said second surface of said focusing lens have a spherical or an aspherical configuration.

20. The module of claim 18, further comprising an aperture member at the end of the optical fiber, wherein said aperture member is shaped so as to partially block transmission of the laser beam transmitted through said focusing lens onto the end of the optical fiber.

21. The module of claim 18, wherein said focusing lens is formed of one of amorphous polyorefin, acrylic resin, polycarbonate, and norbornene resin.

22. The module of claim 18, wherein said planer diffraction lens is formed of a plastic material including light-absorbing material.

23. The module of claim 18, further comprising a light-absorbing film disposed on one of said first surface or said second surface of said planer diffraction lens.

24. A laser light source comprising:

a laser diode for emitting a laser beam;

a lens for transmitting the laser beam emitted by said laser diode, said lens having a first surface and a second surface opposite said first surface, at least one of said first surface and said second surface having a curved configuration and having diffraction zones formed thereon, said diffraction zones having a shape and being spaced apart such that a focal position shift of the laser beam due to a change in oscillation wavelength of said laser diode due to a temperature change is in an opposite direction to a focal position shift of the laser beam due to thermal expansion or thermal contraction of said lens and an index of refraction of said focusing lens; and a holder holding said laser diode and said lens.

25. The module of claim 24, wherein said at least one of said first surface and said second surface has a spherical or an aspherical configuration.

26. The module of claim 24, wherein said lens comprises a single lens.

27. The module of claim 24, further comprising a metal frame, wherein said focusing lens is integrated with said metal frame so as to form a lens member, said lens member being mounted in said holder.

28. The module of claim 24, wherein said focusing lens is formed of one of amorphous polyorefin, acrylic resin, polycarbonate, and norbornene resin.

* * * * *